March 27, 1962
L. S. CROIX
3,027,299
ANESTHETIC COMPOSITION COMPRISING HALOVINYL
ETHER AND HALO HYDROCARBON
Filed Nov. 25, 1959
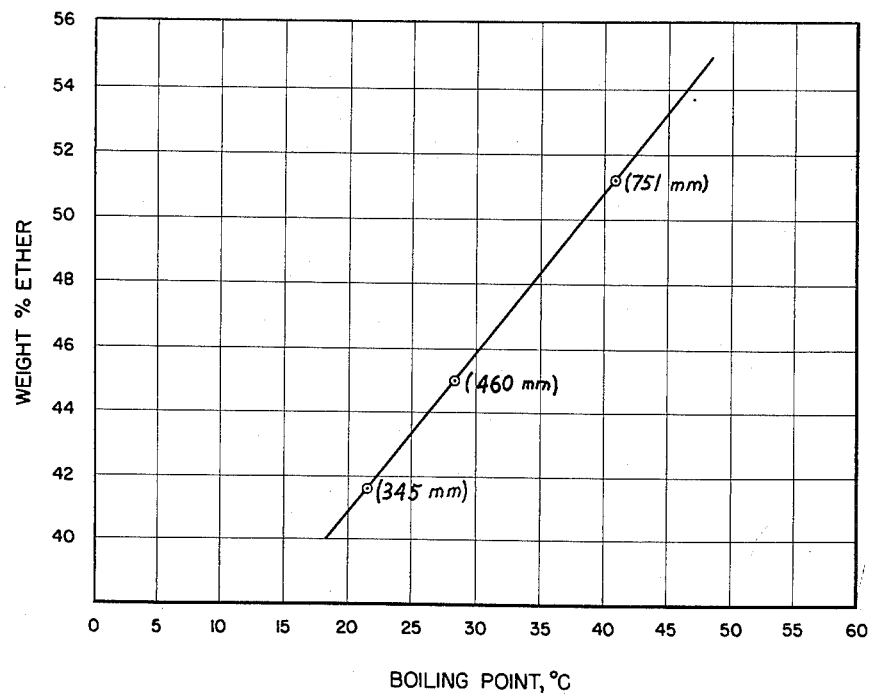
*INVENTOR.*
LOUISE S. CROIX
BY United States Patent Office
3,027,299
Patented Mar. 27, 1962

3,027,299
ANESTHETIC COMPOSITION COMPRISING HALO-VINYL ETHER AND HALO HYDROCARBON
Louise S. Croix, Summit, N.J., assignor to Air Reduction Company, Incorporated, New York, N.Y., a corporation of New York
Filed Nov. 25, 1959, Ser. No. 855,288
12 Claims. (Cl. 167—52)

This invention relates to novel compositions containing 2,2,2-trifluoroethyl vinyl ether effective for use as anesthetic agents and is more particularly concerned with novel compositions which are azeotropic mixtures containing 2,2,2-trifluoroethyl vinyl ether and which have a particularly advantageous use as anesthetic agents. This invention also relates to novel anesthetic agents embodying the aforementioned compositions and to methods of inducing anesthesia by the use of such agents.

The well-known compound 2,2,2-trifluoroethyl vinyl ether, is sold commercially under the trademark "Fluoromar" and is suitably prepared by the method described, for example, in Shukys U.S. Patent 2,799,712.

2,2,2-trifluoroethyl vinyl ether, which is a liquid at room temperature, is a highly efficacious and efficient anesthetic agent and is effectively used as an inhalent anesthetic, in any of the usual systems of administration, including the standard so-called "closed" system. When a liquid anesthetic agent is used, it is vaporized and supplied to the patient in combination with oxygen. 2,2,2-trifluoroethyl vinyl ether is much less flammable than a number of other well-known and comparably-used general anesthetics. However, it is not completely inert to combustion and it has been found that it will burn somewhat in concentration above a predetermined limit of concentration known as the flammability limit.

It has been sought to take advantage of the desirable characteristics of 2,2,2-trifluoroethyl vinyl ether by providing a composition which has a higher flammability limit per unit volume than an equal volume of 2,2,2-trifluoroethyl vinyl ether. While admixture with another agent may broadly be recognized as one expedient for depressing the flammability of ignitible vapors, such expedients are not ordinarily capable of application in connection with anesthetic agents because either such admixed materials have a toxic or undesirable pharmaceutical effect when administered to the patient or because they adversely affect the anesthetic effect of the principal anesthetic agent.

Furthermore, since liquid anesthetics must be vaporized before use, the added agent must also vaporize proportionately or it will fail to serve its intended purpose. When it is desired to vaporize and deliver vapors of a mixture of constituents in substantially constant or fixed proportions, a major problem exists. Such constant proportion vaporization requires the presence of an azeotropic agent.

It is thus an object of the present invention to provide compositions containing 2,2,2-trifluoroethyl vinyl ether which have lower flammability per unit volume than 2,2,2-trifluoroethyl vinyl ether alone yet which maintain the anesthetic efficacy and efficiency of this compound.

It is another object of the present invention to provide compositions of the character indicated which form constant boiling mixtures and will vaporize in substantially fixed proportions at a given temperature and pressure.

In accordance with the invention, there are provided compositions which comprise mixtures of 2,2,2-trifluoroethyl vinyl ether and 1,1,2-trichloro-1,2,2-trifluoroethane. The surprising discovery has been made that 2,2,2-trifluoroethyl vinyl ether forms minimum-boiling azeotropes with 1,1,2-trichloro-1,2,2-trifluoroethane. These azeotropic mixtures boil at constant boiling points at a given pressure, the boiling point varying with varying pressures and the relative proportions of these two compounds varying for different boiling points at different pressures, as will be well understood by those skilled in the art. Thus, at a nominal atmospheric pressure of 751 mm. Hg, a mixture of 51.2% by weight of 2,2,2-trifluoroethyl vinyl ether and 48.8% by weight of 1,1,2-trichloro-1,2,2-trifluoroethane has a constant boiling point of about 40.7° C. As a result, at atmospheric pressure, or at any other pressure, a mixture of 2,2,2-trifluoroethyl vinyl ether and 1,1,2-trichloro-1,2,2-trifluoroethane when boiled will yield vapors that will have the same composition throughout the period of vaporization of the mixture and the proportions of the two constituents in the vapors will remain constant until all of one constituent has been vaporized or, if the liquid mixture contains the constituents in the proportions found in the azeotrope at the prevailing pressure, until all of the liquid has been vaporized. It will be readily appreciated that such formation of azeotropes is of major importance in solving the problems referred to above. This characteristic is particularly advantageous in connection with the vaporization and administration of 2,2,2-trifluoroethyl vinyl ether for the production of anesthesia.

A particularly suitable azeotropic mixture of these constituents contains 45% by weight of 2,2,2-trifluoroethyl vinyl ether and 55% by weight of 1,1,2-trichloro-1,2,2-trifluoroethane and has a vapor pressure of 460 mm. Hg at 28° C. and a density at this temperature of 1.34. This azeotropic mixture is exceptionally useful for anesthetic purposes because of the ease with which such a mixture can be used in the most widely employed types of liquid anesthetic vaporizer apparatus units. Thus, such an azeotropic mixture, when placed in anesthetic vaporizers of the types commonly employed, will readily vaporize at room temperature and permit a carrier gas stream of oxygen conducted over the surface of the liquid mixture, or in contact with the liquid mixture, to entrain or carry off therewith the vapors of the mixture in a proportion corresponding to the ratio of the vapor pressure of the liquid to the prevailing atmospheric pressure. It will be understood, of course, that the conventional forms of anesthetic administering apparatus units operate substantially at about one atmosphere so that the carrier gas passed over the above-mentioned azeotropic mixture will mix with the vapors of the volatilized agent in a proportion corresponding to the partial pressure of the agent.

It will be understood, however, that other mixtures of 2,2,2-trifluoroethyl vinyl ether and 1,1,2-trichloro-1,2,2-trifluoroethane may be employed for anesthesia purposes but, as a general rule, the mixture should comprise from 40 to 55% by weight, preferably 44–46% by weight, of 2,2,2-trifluoroethyl vinyl ether and 45 to 50% by weight, preferably 54–56% by weight, of 1,1,2-trichloro-1,2,2-trifluoroethane.

It has been found that not only does the compound 1,1,2-trichloro-1,2,2-trifluoroethane form azeotropes with 2,2,2-trifluoroethyl vinyl ether so that when the mixture is vaporized the proportions of the materials in the vapors will remain constant, but 1,1,2-trichloro-1,2,2-trifluoroethane has been found to be substantially free of undesirable or toxic effects and has also been found to sustain the anesthetic potency of 2,2,2-trifluoroethyl vinyl ether. Consequently, when 1,1,2-trichloro-1,2,2-trifluoroethane is combined with the 2,2,2-trifluoroethyl vinyl ether and administered to a patient, none of the significant properties of 2,2,2-trifluoroethyl vinyl ether as an anesthetic are sacrificed to any significant extent. There is thus a synergistic action between the two components of the mixture.

As previously mentioned, 2,2,2-trifluoroethyl vinyl ether is suitably prepared by the method described in Shukys Patent 2,799,712. 1,1,2-trichloro-1,2,2-trifluoroethane is a known compound and is readily prepared by known procedures.

Azeotropic mixtures of 2,2,2-trifluoroethyl vinyl ether and 1,1,2-trichloro-1,2,2-trifluoroethane may be readily prepared by directly mixing the two compounds in the proportions appropriate to any particular azeotrope. Alternatively, the azeotropic mixtures may be readily prepared by distillation of a mixture of the two compounds through a fractionating column maintained at the pressure at which it is desired to have the azeotrope distil, the azeotrope being collected as the lowest boiling distillate. In order to insure effective separation of the azeotrope a distillation column of 100 theoretical plates or greater is advantageously used.

Regardless of the proportions of 1,1,2-trichloro-1,2,2-trifluoroethane and 2,2,2-trifluoroethyl vinyl ether in the mixture being distilled, there will distil a minimum-boiling azeotrope of a composition characteristic of the pressure under which distillation is being carried out. For example, when a 50–50 wt. percent mixture of the two compounds and mixtures in which the excess of each compound ranged from 30 to 70%, were fractionally distilled at substantially atmospheric pressure, i.e. 751 mm. Hg, there was always obtained the above-mentioned azeotrope distilling at 40.7° C. which consisted of 51.2% by weight of 2,2,2-trifluoroethyl vinyl ether and 48.8% by weight of 1,1,2-trichloro-1,2,2-trifluoroethane. This azeotrope had a constant refractive index ($n_D^{20}$) of 1.3330, and a density at 20° C. of 1.301.

Distillation as described above, is a convenient means for establishing the boiling point and providing the azeotropic mixtures of these two compounds at any desired pressure. Thus, with the knowledge of the composition of the azeotrope obtained in the foregoing distillation at substantially atmospheric pressure, analysis being effected by well-known routine tests, it is possible to make up any quantity of the azeotrope by mixing 51.2% by weight of 2,2,2-trifluoroethyl vinyl ether and 48.8% by weight of 1,1,2-trichloro-1,2,2-trifluoroethane. The boiling point and refractive index and other properties will be the same as the distilled azeotrope and vapor emerging from the mixture will always have the same concentration of each component of the mixture. There can, in like manner, be produced the above-mentioned azeotrope of 45% by weight of 2,2,2-trifluoroethyl vinyl ether and 55% by weight of 1,1,2-trichloro-1,2,2-trifluoroethane having a boiling point of 28° C. at a pressure of 460 mm. Hg. Similarly, there can be produced an azeotrope containing 41.6% by weight of 2,2,2-trifluoroethyl vinyl ether and 58.4% by weight of 1,1,2-trichloro-1,2,2-trifluoroethane which has a boiling point of 21.4° C. at a pressure of 345 mm. Hg. In the accompanying drawing, there is shown azeotropic composition within the limits set forth above plotted against boiling point in ° C.

When the compositions of this invention are used for anesthetic purposes, it is necessary to have each component in a relatively pure pharmaceutically-acceptable form free from toxic contaminants. Thus, 2,2,2-trifluoroethyl vinyl ether and 1,1,2-trichloro-1,2,2-trifluoroethane, if not available in pharmaceutically acceptable form, are advantageously purified individually by washing with water and washing with an aqueous solution of a mineral acid, e.g. HCl, followed by a further wash with water and with an aqueous solution of caustic alkali. The washed material is dried and is then fractionally distilled. Advantageously, the 2,2,2-trifluoroethyl vinyl ether is admixed with a small amount, e.g. .01% by weight, of an alkaline agent as a stabilizer, e.g. phenyl-alpha-naphthylamine. Typical stabilizers and the details of the purification procedure to be used when required, and which is applicable to both components of the compositions of this invention, are described in the above-mentioned Shukys Patent 2,830,007.

When the compositions of this invention are used for anesthesia, a quantity of the liquid composition to be employed is, for example, placed in an anesthetic vaporizer of any convenient type incorporated in any standard type of anesthetic system. A suitable vaporizer and closed circuit system are shown, for example, in Hay U.S. Patent 2,864,363. In such a circuit, as is well-known, an inhalant device, such as a mask, is placed over the face of the subject to be anesthetized and the inhalation and exhalation gases are continuously circulated, a suitable quantity of oxygen being added to the closed circuit corresponding to the oxygen which is consumed by the subject and exhaled as carbon dioxide and removed from the system by suitable chemical absorbent means, as shown in the Hay patent. It has been found that concentrations of the order of about 6% by weight or higher of the azeotropic mixture may be readily maintained in the respiratory gas and that such concentrations are highly effective to produce anesthesia in the subject. It will be understood that open or semi-open type administration systems may also be employed. In general, the effectiveness of the azeotropic composition is comparable to that of 2,2,2-trifluoroethyl vinyl ether alone. Consequently, its administration to produce the desired level of anesthesia or analgesia is effective in substantially the same manner as in the case of 2,2,2-trifluoroethyl vinyl ether when administered by itself.

While the mixtures of 2,2,2-trifluoroethyl vinyl ether and 1,1,2-trichloro-1,2,2-trifluoroethane which form the novel anesthetic compositions of this invention are suitably administered in admixture with oxygen alone, in accordance with standard techniques in the administration of volatile anesthetics for inhalation, the compositions may also be employed in combination with other anesthetic agents such as nitrous oxide or cyclopropane or supplementary medicaments such as d-tubocurarine, succinylcholine, and the like, with which the compositions are fully compatible.

In order to demonstrate clinically the efficacy as anesthetics of azeotropic mixtures of 2,2,2-trifluoroethyl vinyl ether and 1,1,2-trichloro-1,2,2-trifluoroethane, a typical azeotropic composition corresponding to this invention and comprising 45% by weight of 2,2,2-trifluoroethyl vinyl ether (stabilized with 0.01% by weight of phenyl-alpha-naphthylamine) and 55% by weight of 1,1,2-trichloro-1,2,2-trifluoroethane was administered in admixture with oxygen to twenty-eight patients by means of a standard anesthetic vaporizer and administering apparatus. In the following discussion of the clinical observations, the azeotropic mixture will be referred to as azeotrope A for convenience.

The patients were all undergoing operative procedures and ranged in age from 9 months to 75 years and were predominately female as shown in the following table.

*Table 1*

| Age: | Number of patients |
|---|---|
| Up to 10 years | 4 |
| 11–20 years | 2 |
| 21–30 years | 1 |
| 31–40 years | 7 |
| 41–50 years | 5 |
| 51–60 years | 7 |
| 71–80 years | 2 |
| Sex: | |
| Female | 21 |
| Male | 7 |

Operations included gynecologic (17), urologic (6), general surgical (3) and otolaryngologic (2).

Induction of anesthesia was found to be extremely rapid. As a rule, the patient entered plane one within 3 to 5 minutes after induction of the anesthetic. Excitement during induction was minimal or absent altogether. Concentrations of 6% to 8% of azeotrope A in oxygen were used to maintain a light plane of anesthesia. Maintenance of light anesthesia was not associated with any depression of the respiration or blood pressure. Anesthesia of this plane is sufficient for all operative procedures on the head, neck, thorax, extremities and perineum. For the deeper relaxation required for laryngoscopy and intraabdominal operations, deeper planes of anesthesia were required. Concentrations of 10% to 15% of azeotrope A were required to maintain anesthesia of planes 2 to 4.

Recovery from anesthesia was extremely rapid. Depending upon the depth of anesthesia just before use of azeotrope A is discontinued, the patient may recover his protective reflexes and be responsive within 3 to 10 minutes after removal of the mask. Postoperative nausea, retching and emesis were minimal. Six of the twenty-eight patients exhibited transient nausea shortly after recovery from anesthesia, but only two showed moderate emesis. There were no cases of prolonged nausea or vomiting. Although recovery of reflexes and return to near normal levels of awareness occurred soon after the end of the anesthetic, most patients appeared to have some residual analgesic activity. Post anesthetic excitement was extremely rare, and the patients did not require narcotics for pain relief for one to two hours postoperative. This experience is in marked contrast to that observed following cyclopropane anesthesia, and the post operative courses of these patients were extremely favorable.

Thus, azeotrope A produced a rapid induction of anesthesia, the level of which was readily controllable. Recovery was likewise rapid, and was smooth and relatively free of excitement, nausea and emesis. The lack of flammability and moderate muscular relaxation associated with the lesser concentrations required for lighter planes of anesthesia are important attributes.

To determine the lower limit of flammability, azeotrope A was placed in the vaporizer and delivered in various concentrations to the outflow tubing of the gas anesthesia apparatus. Samples were withdrawn in 20 cc. syringes. These syringes were then capped and the plunger pulled out over the flame of an alcohol lamp. A faint blue flame was noted in the barrel of the syringe when the agent was in the flammable range of concentration. Azeotrope A in a concentration of 7.5%, was found to be non-flammable. 2,2,2-trifluoroethyl vinyl ether was also tested by the same method and found to have a limit of flammability of 4%. Although the concentrations required for deeper planes border on the lower limit of flammability, such mixtures are difficult to ignite and they burn very feebly. Further, during clinical anesthesia, the azeotrope A-oxygen mixture is diluted with carbon dioxide, nitrogen, and water vapor. For these reasons azeotrope A was found to pose no practical problem from the standpoint of safety.

When the mixture of 2,2,2-trifluoroethyl vinyl ether and 1,1,2-trichloro-1,2,2-trifluoroethane, e.g. the azeotropic mixture of these two compounds such as the azeotrope A, is used for anesthetic purposes, the concentration of the mixture in the respirable gas, e.g. oxygen, mixtures of oxygen and nitrous oxide, air and other respirable gases conventionally used, is advantageously at least 4% by volume of the azeotropic mixture, preferably at least about 6% of the azeotropic mixture and may range up to about 20% by volume. The particular percentage employed will, of course be determined by the anesthetist in accordance with the specific requirements of the patient during the period of anesthesia. The relative proportions of oxygen to nitrous oxide or other gases making up the respirable gas are those conventionally used in standard anesthesia techniques. Similarly, when other medicaments are combined with the anesthetic medium, they are employed in the usual quantities as determined by the physician in charge.

It will be understood that various changes and modifications may be made in the embodiments of the invention described above without departing from the scope of the invention as defined in the appended claims and it is intended, therefore, that all matter contained in the foregoing description shall be interpreted as illustrative only and not as limitative of the invention.

What I claim and desire to secure by Letters Patent is:

1. A constant boiling mixture composed of 2,2,2-trifluoroethyl vinyl ether and 1,1,2-trichloro-1,2,2-trifluoroethane.

2. An azeotropic composition comprising about 45% by weight of 2,2,2-trifluoroethyl vinyl ether and about 55% by weight of 1,1,2-trichloro-1,2,2-trifluoroethane.

3. A respirable anesthetic composition comprising oxygen, and a constant boiling mixture of 2,2,2-trifluoroethyl vinyl ether and 1,1,2-trichloro-1,2,2-trifluoroethane.

4. A stable volatile liquid composition comprising 2,2,2-trifluoroethyl vinyl ether in admixture with 1,1,2-trichloro-1,2,2-trifluoroethane to form a constant boiling mixture, effective for the production of anesthesia upon inhalation of the vapors thereof.

5. The method which comprises administering to a human patient a respirable composition comprising essentially oxygen gas, and a constant boiling mixture of 2,2,2-trifluoroethyl vinyl ether and 1,1,2-trichloro-1,2,2-trifluoroethane, the said oxygen being present in an amount sufficient for respiratory purposes, and continuing said administration until a state of anesthesia is induced in said patient.

6. A volatile anesthetic agent for the production of anesthesia in man consisting essentially of 2,2,2-trifluoroethyl vinyl ether containing a stabilizing amount of alkaline stabilizing agent and 1,1,2-trichloro-1,2,2-trifluoroethane, said 2,2,2-trifluoroethyl vinyl ether and said 1,1,2-trichloro-1,2,2-trifluoroethane forming a constant boiling mixture.

7. A respirable gaseous anesthetic mixture comprising essentially oxygen, and a constant-boiling mixture of 2,2,2-trifluoroethyl vinyl ether and 1,1,2-trichloro-1,2,2-trifluoroethane, said oxygen being present in an amount sufficient for respiratory purposes and said ether and said trifluoroethane being present in a proportional amount of at least about 4% by volume of the respirable gaseous mixture and sufficient for the induction of anesthesia in man.

8. A gaseous composition for the production of anesthesia in man comprising a constant-boiling mixture of 2,2,2-trifluoroethyl vinyl ether and 1,1,2-trichloro-1,2,2-trifluoroethane, and oxygen as essential active ingredients, said ether and said trifluoroethane being present in an amount at least about 4% by volume and said oxygen being present in an amount not less than about 20% by volume.

9. The method which comprises administering a constant-boiling mixture of 2,2,2-trifluoroethyl vinyl ether and 1,1,2-trichloro-1,2,2-trifluoroethane to a human patient in an amount and at a rate which will establish and maintain a concentration of said ether and said trifluoroethane in the blood stream of said patient sufficient to render said patient substantially insensible to pain.

10. A method of preparing an inhalation anesthetic which comprises intermixing 2,2,2-trifluoroethyl vinyl ether and 1,1,2-trichloro-1,2,2-trifluoroethane and recovering the constant-boiling mixture obtained thereby.

11. The method of administering an inhalation anesthetic which comprises admixing a constant-boiling mixture of 2,2,2-trifluoroethyl vinyl ether and 1,1,2-trichloro-1,2,2-trifluoroethane with a source of oxygen, and administering the resulting mixture to a human patient in an amount and at a rate which will establish and maintain a concentration of said ether and said trifluoroethane in the blood stream of said patient sufficient to render said patient substantially insensible to pain.

12. The method of administering an inhalation anesthetic as defined in claim 11, wherein the mixture is present in a concentration of at least about four percent by volume.

No references cited.